United States Patent [19]

Reiss et al.

[11] Patent Number: 4,692,363
[45] Date of Patent: Sep. 8, 1987

[54] THERMAL INSULATION

[75] Inventors: Harald Reiss, Leimen; Botho Ziegenbein, Nickarsteinach, both of Fed. Rep. of Germany

[73] Assignee: Brown, Boveri & Cie AG, Mannheim-Käfertal, Fed. Rep. of Germany

[21] Appl. No.: 889,581

[22] Filed: Jul. 22, 1986

Related U.S. Application Data

[63] Continuation of Ser. No. 742,631, Jun. 6, 1985, abandoned, which is a continuation of Ser. No. 536,178, Sep. 27, 1983, abandoned.

[30] Foreign Application Priority Data

Sep. 27, 1982 [DE] Fed. Rep. of Germany ....... 3235708

[51] Int. Cl.$^4$ .................... A47J 41/02; B65D 81/38; F16L 59/05; F16L 59/06; F16L 59/08
[52] U.S. Cl. ..................................... 428/36; 138/149; 220/421; 220/422; 220/423; 220/424; 428/69; 428/75; 428/76; 428/283; 428/285; 428/297; 428/303; 428/328; 428/329
[58] Field of Search ............... 220/421, 422, 423, 424; 138/149; 428/283, 285, 297, 303, 36, 69, 75, 76

[56] References Cited

U.S. PATENT DOCUMENTS

| 2,967,152 | 1/1961 | Matsch et al. | 220/421 |
|---|---|---|---|
| 3,007,596 | 11/1961 | Matsch | 220/423 |
| 3,009,600 | 11/1961 | Matsch | 220/423 |
| 3,009,601 | 11/1961 | Matsch | 220/423 |
| 3,151,364 | 10/1964 | Glaser et al. | 220/423 |
| 3,166,511 | 1/1965 | Matsch | 220/423 |
| 3,199,714 | 8/1965 | Bodendorf et al. | 220/423 |
| 3,199,715 | 8/1965 | Pawanas | 220/424 |
| 3,514,006 | 5/1970 | Molnar | 220/423 |
| 3,715,265 | 2/1973 | Allen et al. | 220/422 |
| 4,425,413 | 1/1984 | Zeigenbein et al. | 220/422 |

Primary Examiner—James C. Cannon

[57] ABSTRACT

Thermal insulation for placement in a gas-tight and at least partially evacuated space in a hollow chamber, including insulating material in fiber form, and at least one substance admixed to the insulating material for absorbing and/or scattering thermal radiation.

4 Claims, 3 Drawing Figures

THERMAL INSULATION

This application is a continuation of application Ser. No. 742,631, filed June 6, 1985, now abandoned, which latter application is a continuation of parent application Ser. No. 536,178, filed Sept. 27, 1983, now abandoned.

The invention relates to thermal insulation containing insulating material in fiber form, which is to be placed in a hollow space that is gas tight and is at least partly evacuated.

Such thermal insulation is applicable to power engineering, especially in devices in which thermal losses are to be avoided. Thermal insulation is used, among other things, in high-temperature storage batteries of the alkali metal and chalcogen type. The storage cells are surrounded by thermal insulation in order to prevent them from cooling down in pauses during the operation of the high-temperature storage batteries, so that a temperature of 350° C. prevails in the storage cells even after the pauses. This is a necessary condition for optimum operating of the storage cells. A further field of application for thermal insulation is in piping systems, within which hot flowing media such as gases, are transported.

German Published Non-Prosecuted Application No. DE-OS 28 19 026, describes an electrochemical storage battery with thermal insulation. The insulation is formed by an evacuated space, within which metal foils are disposed. The metal foils are disposed perpendicular to the direction of the temperature gradient. The spacing of the metal foils is very small. A disadvantage of this insulation is that it cannot be subjected to pressure without causing a strong increase of the thermal conductivity. If the insulation is loaded by a weight, the metal foils are pressed together, and increasing planar contact areas are formed between the individual foils. The solid-body component of the total conductivity of the thermal insulation is therefore increased to values which are no longer negligible.

Thermal insulation for high-temperature storage batteries is also known in which the insulation is constructed from glass or mineral wool. In order to obtain a sufficiently large effect, considerable wall thicknesses must be provided with this insulation, so that the high-temperature storage batteries do not cool down too fast, especially during the operating pauses, and so that the operating temperature of 350° C. can be kept for a long period of time. Since such thick-walled insulation considerably increases the dimensions and/or the weight of the high-temperature storage battery, the energy storage density, i.e., the amount of energy which can be stored per unit weight or volume, is low.

Furthermore, different powder and fiber vacuum insulations for the cryogenic and high-temperature range have been described (for instance, in the publication entitled "Advances in Heat Transfer", volume 9, edited by Thomas F. Levine, James P. Hartnet, 1973). By using sufficiently fine materials in powder or fiber form with diameters smaller than or equal to 5 microns, very low thermal conductivity values can be achieved, even at atmospheric pressure loads. The conventional evacuated powder insulations for the most part use highly dispersed powders, such as silicon aero-gel, with various admixtures for reducing the radiation transmission, such as Al or $Fe_3O_4$. The disadvantage of this powder insulation is that at an atmospheric pressure load, the solid-body conductivity increases to more than $5\times10^{-3}$ W/mK. As a result, the overall conductivity distinctly exceeds this last-mentioned value as a function of the temperature level. It is a further disadvantage of powder insulation that a sufficiently low degassing rate which is to ensure the operation of the insulation over extended periods of time, can only be provided at great cost.

With the conventional evacuated fiber insulation, a distinctly lower solid-body conductivity of 1 to $2\times10^{-3}$ W/mK can be achieved even with atmospheric pressure loading. However, it is a feature common to these fiber insulations, that about 50% of the heat transmission occurs by radiation in spite of the high scattering capability, such as at a temperature of 300 K. on the cold side and 600 K. on the hot side.

In U.S. Pat. No. 3,199,714, it is proposed to admix up to 45% by weight radiation-reflecting Al or Cu flakes, at which geometric reflections of the thermal radiation occur, in order to increase the radiation absorbance of fiber insulation. However, this high thermal conductivity of the metallic powders leads to the expectation that because of the effective densities which occur under atmospheric pressure load with a compression of smaller than or equal to 10%, the overall thermal conduction increases steeply, since the insulation is bridged or shunted by the formation of contacts between the flakes (as described in the publication entitled "Insulation Development for High-Temperature Batteries for Electric Vehicle Application (Final Report)", Union Carbide, Linde Division, DOE Contract No. EM-78-C-01-5160, 1979).

It is, accordingly an object of the invention to provide a thermal insulation for the high-temperature range, especially for temperatures of 350° C. and above, which overcomes the hereinafore-mentioned disadvantages of the heretofore-known devices of this general type, which has very low thermal conductivity, which can be subjected to pressure loads and which can be made very light weight and small as to its dimensions or overall volume.

With the foregoing and other objects in view, there is provided in accordance with the invention, a thermal insulation with a gas-tight and at least partially evacuated space, filled with insulating sheets stacked immediately adjacent one another with no metal foil interposed between respective sheets, each of the insulating sheets has a thickness of about 0.5 mm built of interlaced borosilicate glass fibers and at least 5 through 60% by weight of substances in form of powder or fibers for absorbing and scattering thermal radiation, at least one of said absorbing substances in fiber or powder form has primary particle diameters smaller than one micron and the indices of refraction of the particles of said scattering substances correspond to optimum values determined from a scatter calculation, taking spectral ranges of the thermal insulation into consideration.

The insulating material in fiber form may be mat-like, paper-like or foil-like. It may be, for instance, ceramic or fiberglass paper which is formed of microfibers. The substances which absorb and/or scatter the thermal radiation adhere to the individual microfibers. These substances are non-metallic and are characterized by low solid-body conductivity. They are preferably in the form of powder or fibers and have a primary particle diameter which is smaller than 10 microns.

For absorbing the thermal radiation, metallic oxides, carbides or nitrides are preferably used. Magnetite, for instance, has been found suitable as the absorbing substance. The high absorptivity of carbon can also be utilized.

The absorbing substances are characterized by very low solid-body conductivity and particle diameters as small as desired, which among other things, precludes the development of thermal bridges.

Besides the admixture of absorbing substances, it is also proposed to employ non-metallic scattering admixtures with optimum particle diameters following from scatter calculations for the fiber insulation (as described by H. C. van der Hulst, in "Light Scattering by Small Particles", Dover Publications, Inc., New York 1975), for the local increase of the absorbance in the corresponding spectral range. If a defined particle diameter is maintained, the scattering can be confined to a small wavelength range of the thermal spectrum (selective scattering), while the scattering covers wider wavelength ranges if the particle size is more broadly distributed.

In many cases, the particle diameters of the scattering substances can be determined in such a way that they are in the order of magnitude of the wavelength of the incident radiated heat.

The thermal insulation according to the invention can be manufactured in such a manner that the absorbing and/or scattering substances of the fiber dispersion are admixed to the insulating material as homogeneously distributed powder particles, before they are solidified.

Advantageously, the thermal insulation can be used not only for the thermal insulation of an apparatus which has a temperature between 300° and 600° C., but the possibility also exists to apply the thermal insulation even in the high-temperature range. The insulation is of particular interest in thermal insulation for piping networks which ar provided for transporting flowing media. This thermal insulation is particularly constructed for temperatures of 800° C. and above. The insulation is intended particularly for the thermal insulation of piping systems which extend over several kilometers.

Other features which are considered as characteristic for the invention are set forth in the appended claims.

Although the invention is illustrated and described herein as embodied in thermal insulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
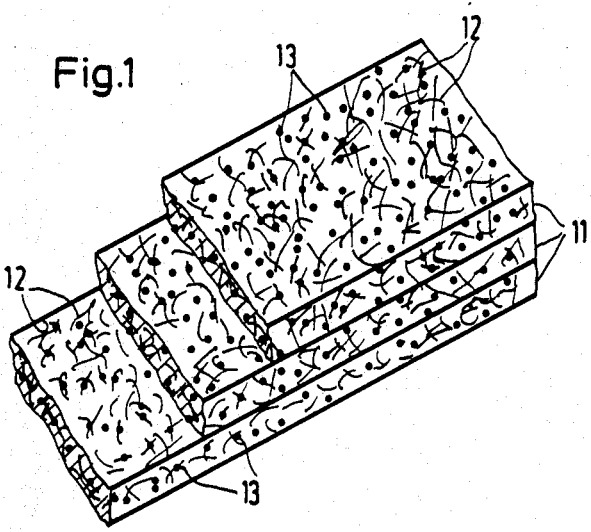
FIG. 1 is a fragmentary, diagrammatic, perspective view of several layers of insulation according to the invention, stacked on top of each other.

Referring now to the figures of the drawings in detail and first particularly to FIG. 1 thereof, there is seen a piece of thermal insulation according to the invention, shown in a perspective view. The insulation contains insulating layers 11 stacked on top of each other, only three of which are shown for the sake of simplification of the presentation. The layers 11 are formed of concentrated or condensed mutually interlaced borosilicate glass fibers 12, the diameter of which is smaller than 1 micron. The thickness of each insulating layer 11 is about 0.5 mm. Substances 13 in powder or fiber form are evenly and very finely distributed in the insulating layers 11. This involves heat radiation-absorbing and/or scattering substances which are deposited on the borosilicate glass fibers 12. In particular, the radiation-absorbing powdery substance 13 is magnetite powder which is admixed to the glass fibers 12 in an amount equal to 5 to 60% by weight. The particle diameters of the powder are smaller than 0.5 micron.

Figure 2:
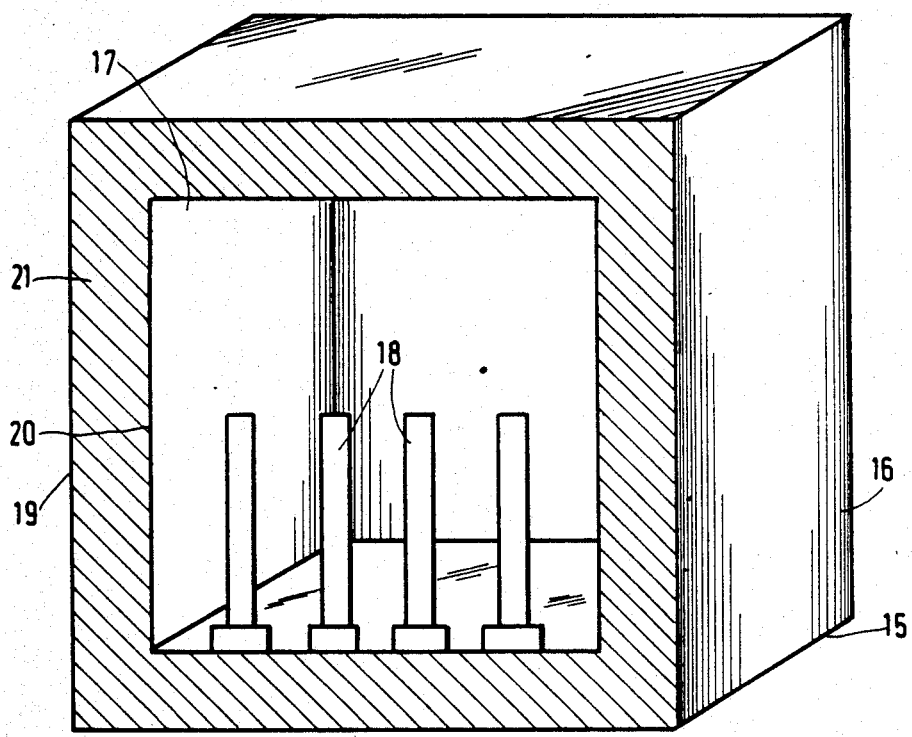
FIG. 2 is a partly vertical-sectional perspective view of an electric battery with thermal insulation.

FIG. 2 shows the thermal insulation 15 which is bordered by a double-wall housing 16. The housing 16 has a square cross section and an interior 17, which is suitable, for instance, for accommodating storage cells 18. The walls of the housing 16 are made of steel or alloy steel. The outer and inner boundary walls 19 and 20 of the housing 16 are disposed parallel to each other at a predetermined spacing. The spacing between the inner and the outer boundary walls 19 and 20 depends on the thickness of the insulation 15. The outer and the inner boundary walls 19 and 20 of the housing 16 define a hollow space 21 therebetween. The outer metallic boundary walls 19 are connected together in a gas-tight manner, and in particular, they are welded together. The same applies to the inner metallic boundary walls 20 of the housing. This measure ensures that the hollow space 21 disposed between the walls 19 and 20 can be gas-tightly sealed. In particular, it can be permanently evacuated. In the embodiment shown in FIG. 2, the hollow space 21 has a residual gas pressure of less than 0.5 mbar.

Before the hollow space 21 is gas-tightly sealed and evacuated, the insulating material in fiber form, is placed in the hollow space. In the embodiment shown in FIG. 2, the insulating material includes about 100 insulating layers 11 as shown in FIG. 1. The layers 11 are disposed one behind the other in parallel planes extending perpendicular to the direction of the temperature gradient. The hollow space 21 is completely filled with the insulating material.

When all of the necessary layers 11 are disposed within the hollow space 21, the outer and inner boundary walls 19 and 20 of the housing 16 are joined together in a gas-tight manner. Subsequently, the hollow space 21 is evacuated. In the case of the thermal insulation 15, shown in FIG. 2, the storage cells 18 of a high-temperature storage battery of the sodium and sulfur type are disposed in the interior 17 of the housing 16. The storage cells 18 are connected to the outside by non-illustrated electric lines. Special non-illustrated openings are provided within the thermal insulation 15 for bringing the electric lines through.

Figure 3:
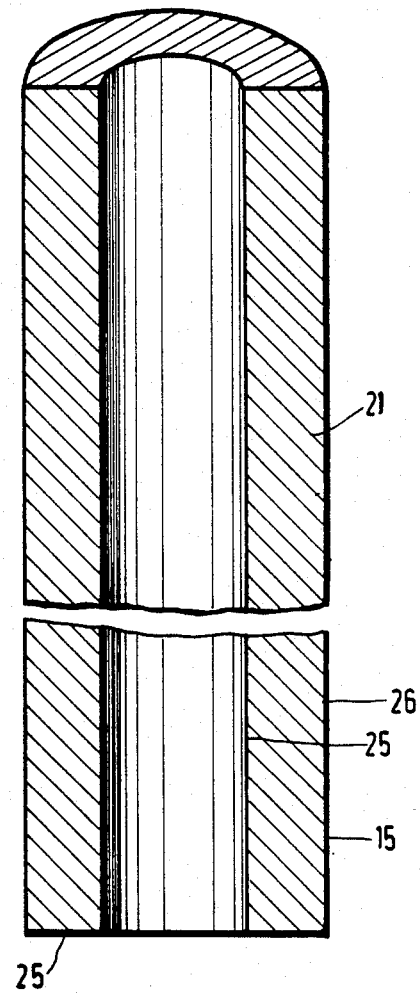
FIG. 3 is another partly sectional perspective view of a pipe intended for hot flowing media, with the insulation according to the invention.

FIG. 3 illustrates a further embodiment of the thermal insulation 15. The insulation of FIG. 3 finds application in a non-illustrated piping system, in which hot flowing media such as gases are transported. FIG. 3 only shows a limited portion of this piping system in an axial sectional view. The thermal insulation is again formed in this case by a hollow space 21 which is sealed gas-tightly against the outside. The hollow space is bounded by two tubes 25 and 26 which have different diameters. In particular, the tube 25 provided with the smaller diameter is concentrically disposed within the pipe 26. A uniform space is therefore created between the two tubes 25 and 26, which serves as the hollow space 21 for the thermal insulation. At the ends of these two tubes 25 and 26, the hollow space 21 is sealed in a gas-tight manner by non-illustrated metal washers. The insulating material is also formed in this case by a multiplicity of stacked insulating layers 11 which are wrapped concentrically around the pipe 25.

If a flowing medium is conducted through the interior of the pipe 25, no appreciable pressure load on the thermal insulation 15 occurs. The insulating layers 11 are, therefore, not compressed. A possible stress of the thermal insulation 15 from the outside, is kept away from the insulating layers 11 by the tube 26. The hollow space 21 formed between the two tubes 25 and 26 is also evacuated in this case. The space should have a residual gas pressure of at most 0.5 mbar.

The invention is not limited to the embodiments shown in FIGS. 2 and 3; it rather covers any thermal insulation in which the insulating material is formed of insulating layers in fiber form. The foregoing is a description corresponding, in substance, to German application No. P 32 35 708.7, dated Sept. 27, 1982, international priority of which is being claimed for the instant application, and which is hereby made part of this application. Any material discrepancies between the foregoing specification and the specification of the aforementioned corresponding German application are to be resolved in favor of the latter.

We claim:

1. Thermal insulation with a gas-tight and at least partially evacuated space, filled with insulating sheets stacked immediately adjacent one another with no metal foil interposed between respective sheets, each of the insulating sheets has a thickness of about 0.5 mm built of interlaced borosilicate glass fibers and with at least 5 through 60% by weight of substances in form of powder or fibers for absorbing and scattering thermal radiation, at least one of said absorbing substances in fiber or powder form has primary particle diameters smaller than one micron and the indices of refraction of the particles of said scattering substances correspond to optimum values determined from a scatter calculation, taking spectral ranges of the thermal insulation into consideration.

2. Thermal insulation with a gas-tight and at least partially evacuated space, filled with insulating sheets stacked immediately adjacent one another with no metal foil interposed between respective sheets, each of the insulating sheets has a thickness of about 0.5 mm built of interlaced borosilicate glass fibers and substances with at least 5 through 60% by weight of carbon in form of powder or fibers attached to the borosilicate fibers for absorbing and scattering thermal radiation, at least one of said absorbing substances in fiber or powder form has primary particle diameters smaller than one micron and the indices of refraction of the particles of said scattering substances correspond to optimum values determined from a scatter calculation, taking spectral ranges of the thermal insulation into consideration.

3. Thermal insulation with a gas-tight and at least partially evacuated space, filled with insulating sheets stacked immediately adjacent one another with no metal foil interposed between respective sheets, each of the insulating sheets has a thickness of about 0.5 mm built of interlaced borosilicate glass fibers and substances with at least 5 through 60% by weight of a nitride in form of powder or fibers attached to the borosilicate glass fibers for absorbing and scattering thermal radiation, at least one of said absorbing substances in fiber or powder form has primary particle diameters smaller than one micron and the indices of refraction of the particles of said scattering substances correspond to optimum values determined from a scatter calculation, taking spectral ranges of the thermal insulation into consideration.

4. Thermal insulation with a gas-tight and at least partially evacuated space, filled with insulating sheets stacked immediately adjacent one another with no metal foil interposed between respective sheets, each of the insulating sheets has a thickness of about 0.5 mm built of interlaced borosilicate glass fibers and substances with at least 5 through 60% by weight of magnetite in form of powder or fibers attached to the borosilicate fibers for absorbing and scattering thermal radiation, at least one of said absorbing substances in fiber or powder form has primary particle diameters smaller than one micron and the indices of refraction of the particles of said scattering substances correspond to optimum values determined from a scatter calculation, taking spectral ranges of the thermal insulation into consideration.

* * * * *